Nov. 19, 1940.    W. M. MOUNT    2,221,989
GAS AND LIQUID SEPARATOR
Filed Jan. 14, 1939
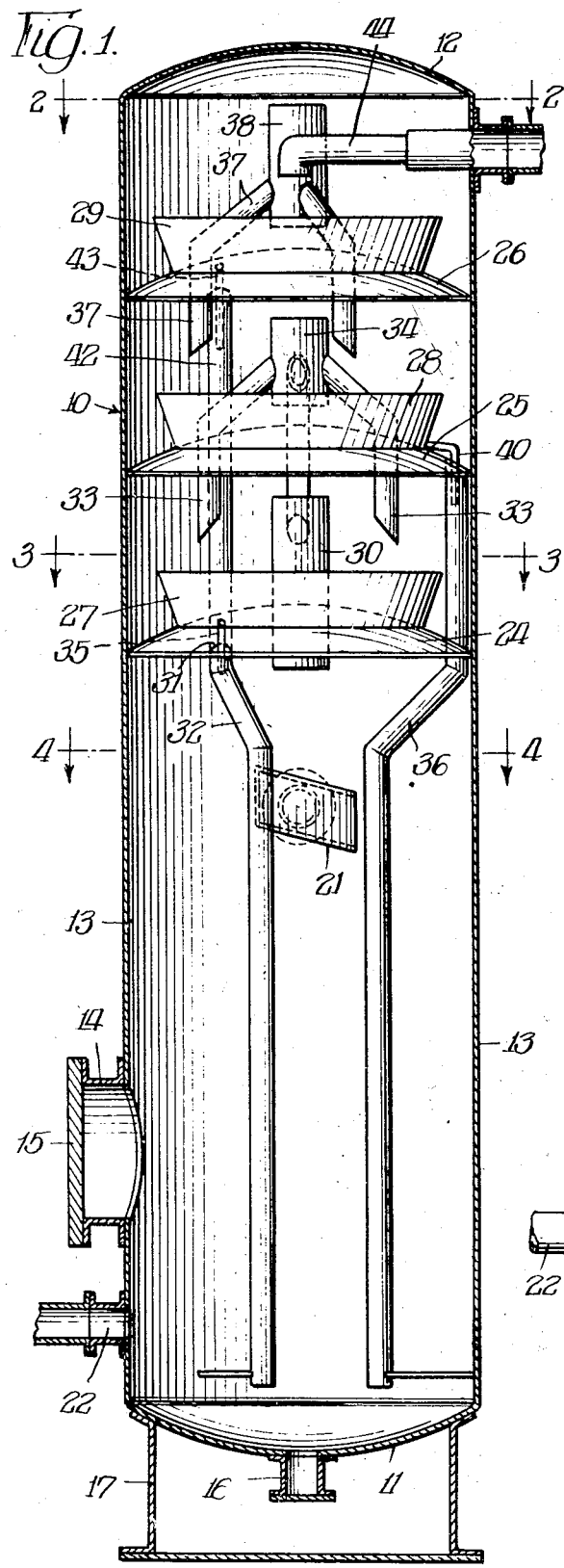
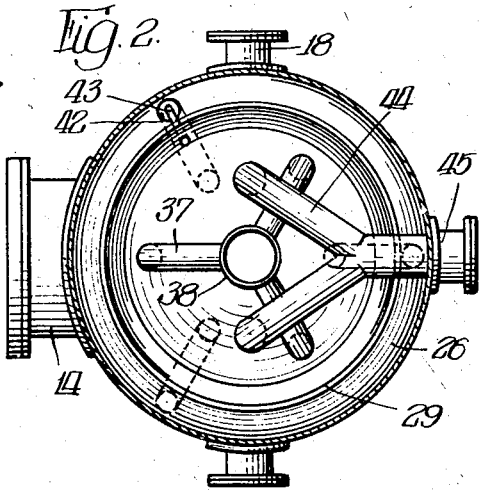
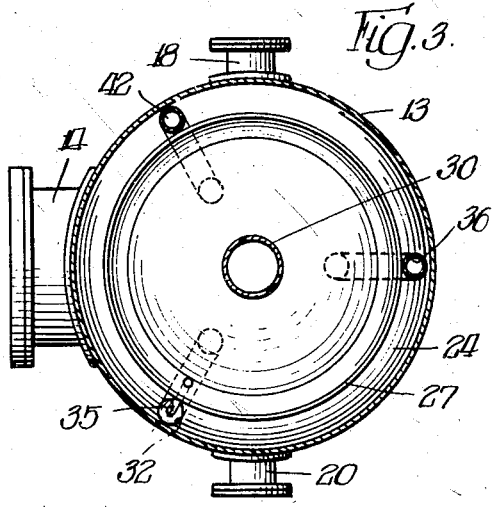
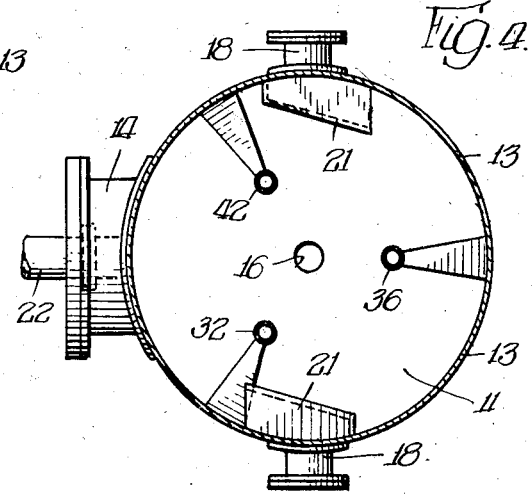
INVENTOR.
Walter M. Mount,
BY
ATTORNEY.

Patented Nov. 19, 1940

2,221,989

UNITED STATES PATENT OFFICE 2,221,989

GAS AND LIQUID SEPARATOR

Walter M. Mount, Tulsa, Okla.

Application January 14, 1939, Serial No. 250,868

2 Claims. (Cl. 183—2.7)

The invention relates to separators and has more particular reference to improved apparatus for separating gas from crude oil.

An object of the invention is to provide apparatus which will separate gas from crude oil and the like by intensive agitation and turbulence of the oil and which will thereafter handle the gas in such a manner as to remove any entrained moisture therefrom and prevent the moisture from again being picked up by the gas.

Another object of the invention is to provide an improved oil and gas separator which will process the separated gas in a plurality of stages, each designed to further separate therefrom any entrained moisture or oil and wherein the liquid is collected in each stage and prevented from further contact with the gas.

Another object is to provide a separator of the character described wherein the separated gas is admitted to each stage at a high velocity and which is utilized to remove any oil or moisture carried along in the gas.

With these and various other objects in view, the invention may consist of certain novel features of construction and operation, as will be more fully described and particularly pointed out in the specification, drawing and claims appended hereto.

In the drawing, which illustrates an embodiment of the invention, and wherein like reference characters are used to designate like parts—

Figure 1 is a view showing in elevation the internal construction of an oil and gas separator embodying the present invention, one-half of the cylindrical cover having been removed;

Figure 2 is a horizontal sectional view taken substantially along line 2—2 of Figure 1;

Figure 3 is a horizontal sectional view taken substantially along line 3—3 of Figure 1; and Figure 4 is a horizontal sectional view taken substantially along line 4—4 of Figure 1.

Referring to the drawing, the gas separator of the invention is housed within a cylindrical tank identified by numeral 10, having a concave bottom 11 and a top 12 of dome-shape and having formed in the cylindrical side wall 13 thereof a manhole 14 provided with cover 15. The bottom 11 is equipped with a drain 16 and the supporting structure 17 engages the bottom member to support the tank in a substantially vertical position.

Crude oil as it is taken from the well carries considerable gas along with it and before the oil is clarified or treated in any manner it is preferred practice to separate the gas therefrom. In the present apparatus two inlets, namely, 18 and 20, admit the crude oil or other liquid to the interior of the tank 13, each inlet having communication with a diversion box 21 located within the tank. Each diversion box has one open end and as best shown in Figure 1, the same is directed downwardly to thereby direct the oil and gas downwardly and which also causes the oil to spiral within the cylindrical tank 13. The diversion boxes subject the oil to intensive agitation and turbulence with the result that the gas separates therefrom and flows upwardly, the oil continuing to flow in a downward direction to the bottom of the tank. The liquid outlet 22 will conduct the oil from the tank and deliver the same to other apparatus for further processing. The gas separated from the oil, as a result of the turbulence of the oil, will generally carry along with it considerable moisture and oil in finely divided form and the present apparatus subjects the separated gas to intensive processing in order to separate therefrom all entrained moisture and the like. This treatment of the gas is accomplished in one or more stages and the separated liquid is collected in each stage and prevented from further contact with the gas.

The upper portion of the present separator is provided with three baffles 24, 25 and 26 of arcuate or dome-shape, and each baffle is positioned so that the concave side thereof is directed downwardly. The curvature of these baffles may be approximately the same as that of the top 12 of the tank. The upper side of each dished baffle supports a baffle pan which is welded or otherwise secured thereto. Accordingly, the baffle 24 supports a baffle pan 27 and the other pans are identified by numerals 28 and 29 for the remaining two baffles, respectively. The gas from the lower part of the tank carrying entrained oil and moisture is admitted to the first stage of the present apparatus through upwardly directed inlet 30 passing through the baffle 24 and located centrally thereof. Since the present separator has two inlets for the crude oil or other liquid a large quantity of oil can be handled and thus the volume of gas separated from the oil will be relatively large. The inlet 30 is restricted in size in order that the velocity of flow through the same will be high. The dished baffle 25 is positioned over the inlet 30 and the gas issuing therefrom will be caused to strike the concave underside of said baffle.

Impact of the gas against the concave surface of the baffle 25 is such as to discharge the finely divided oil or water particles in a radial direction outwardly, and as a result these particles flow along the under surface of the dished baffle in said direction and then downwardly along the inside of the cylindrical walls 13 of the tank. The baffle 24 in effect forms the bottom of the first gas treating stage and the separated oil and moisture flowing downwardly on the inside of the cylindrical walls will be caught by the convex surface of the dished baffle 24 and delivered thereby to the drain opening 31 provided by the outlet pipe 32. The gas having lost considerable of its entrained moisture will leave the first stage through the outlet pipes 33 which pass through the baffle 25 and depend a distance below the same. In the present embodiment three outlet pipes are shown, which, on the opposite side of the baffle 25, converge and connect with the common discharge 34, which delivers the gas to the second treating stage of the present separator. Some of the moisture in flowing along the under surface of baffle 25 will be obstructed by the outlet pipes 33 and this moisture will be caused to flow downwardly along the outside of said pipes. However, the moisture dropping from the end of these outlet pipes is caught by the baffle pan 27 positioned on the convex surface of the baffle 24. This moisture is collected by said baffle pan and the liquid is discharged by the drain pipe 35 to the outlet pipe 32.

The gas issuing from discharge 34 is also at a high velocity and is directed thereby against the concave under surface of baffle 26 centrally thereof. Therefore in the second stage the gas is subjected to treatment similar to the first stage, since any moisture or other finely divided particles of oil carried along with the gas will be discharged radially outward and caused to travel in this direction along the concave surface of baffle 26, being eventually delivered to the inside surfaces of the cylindrical walls. This moisture is caught by the baffle 25, having a drain opening provided by the outlet pipe 36. It will be seen from the foregoing that the impact of the high velocity gas against the dished surfaces of the baffles separates the entrained moisture therefrom and imparts to said moisture movement in a direction which removes the same from further association with the gas. Also when the moisture has been caused to adhere to the under surface of the baffles it is not easily picked up again by the gas which circles within the space formed by adjacent baffles until it is removed from said stage by the depending outlet pipes. In the second stage these outlet pipes are designated by numeral 37, which pipes pass upwardly through baffle 26 and converge to form the common discharge 38. The second stage is also provided with a baffle pan 28 which collects any moisture dripping from the ends of the depending pipes 37 and delivers the same through the drain pipe 40 to outlet 36.

In the third stage of the present separator the gas is again submitted to treatment similar to that described. However, in this stage the baffle positioned over the discharge 38 is formed by the dome top 12 of the tank. The high velocity gas is directed against the concave surface of the top 12 and if any moisture still exists in the gas the same is discharged radially outward and caused to travel in this direction until it is delivered to the cylindrical walls of the tank. The baffle 26 collects the separated moisture which is delivered thereby to the drain provided by outlet pipe 42. The baffle pan 29 collects any moisture which may drip from the gas discharge 38 or the other pipes positioned within this third stage and this moisture is conducted by the drain pipe 43 to pipe 42. The gas is removed from the third stage by the pipes 44 which converge to form the gas outlet 45 for the separator.

In the present separator the gas is processed in one or more stages to remove any finely divided liquid which may be carried along with the gas and for which purpose the gas is admitted to each stage at a relatively high velocity. This high velocity of the gas and the position and shape of the baffles effectively removes the entrained liquid and conducts the same in a direction outwardly so that further contact between the liquid and gas is prevented. In the present embodiment the baffles are shown as dished with their concave side directed downwardly and thus the gas in each stage is directed against this undersurface of the baffle. However, the invention is not limited to the precise form of baffle disclosed as many other shapes would operate in a like manner to direct the entrained moisture radially outward, causing it to flow in this direction along the undersurface of the baffle. Although some of the liquid separated from the gas in each stage may drip from the ends of the outlet pipe conducting the gas to the next stage above, this liquid does not traverse the flow of the gas. Therefore the liquid that has once been removed from the gas is conducted to a drain in a manner so that it will not be picked up again by the gas. The outlet pipes 32, 36 and 42 terminate close to the bottom 11 of the tank and below the outlet 22. These pipes at their lower end dip into the liquid in the tank and are in effect closed to prevent the gas from the various processing stages escaping through these outlet pipes.

What is claimed is:

1. In a gas and liquid separator, a tank having an inlet for liquid located at substantially the mid-portion of the tank, a liquid outlet in the base of the tank, means associated with the inlet for discharging the same within the tank so that any gas carried along with the liquid will separate therefrom, means located within the tank above the liquid inlet for processing the gas in one or more stages to remove moisture and other finely divided liquid therefrom, said means including a dished baffle for each stage secured around its periphery to the tank and having its concave surface directed downwardly, a discharge outlet for the gas terminating adjacent the concave surface of each baffle and disposed substantially centrally of the same, certain of said baffles having at least one outlet pipe passing therethrough and which conducts the gas from the processing stage below the baffle and delivers the same to the discharge outlet above the baffle, said outlets discharging the gas flowing therethrough at a relatively high velocity whereby the gas is directed against the baffles to cause the moisture and other finely divided liquid to separate by impact, the top of said tank providing the baffle for the last processing stage, and said tank having a gas outlet at the upper end thereof for conducting the gas from said last mentioned stage.

2. In a gas and liquid separator, a tank having an inlet for liquid located at substantially the mid-portion of the tank, a liquid outlet in the base of the tank, means associated with the inlet for discharging the same within the tank so that any gas carried along with the liquid will separate therefrom, means located within the tank above the liquid inlet for processing the gas in one or more stages to remove moisture and other finely divided liquid therefrom, said means including a dished baffle for each stage secured around its periphery to the tank and having its concave surface directed downwardly, a discharge outlet for the gas terminating adjacent the concave surface of each baffle and disposed substantially centrally of the same, certain of said baffles having at least one outlet pipe passing therethrough and which conducts the gas from the processing stage below the baffle and delivers the gas to the discharge outlet above the baffle, said outlets discharging the gas flowing therethrough at a relatively high velocity whereby the gas is directed against the baffles to cause the moisture and other finely divided liquid to separate by impact, a drain for conducting the separated liquid from each stage to the bottom of the tank, and said tank having an outlet for the gas at the upper end thereof.

WALTER M. MOUNT.